(12) United States Patent
Lansden et al.

(10) Patent No.: US 9,483,749 B2
(45) Date of Patent: *Nov. 1, 2016

(54) METHOD AND SYSTEM FOR RECONCILING TRANSPORTATION RECORDS

(71) Applicant: JPMorgan Chase Bank, N.A., New York, NY (US)

(72) Inventors: Jennifer M. Lansden, Woodhaven, NY (US); Gerald J Foy, Wilmington, DE (US); Tim Beadle, Dartmouth Woods, DE (US); Richard G. Thomas, Dover, DE (US); Bryan W Groth, Huntley, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/007,582

(22) Filed: Jan. 27, 2016

(65) Prior Publication Data

US 2016/0140494 A1 May 19, 2016

Related U.S. Application Data

(63) Continuation of application No. 14/596,661, filed on Jan. 14, 2015, now Pat. No. 9,251,495, which is a continuation of application No. 14/136,636, filed on Dec. 20, 2013, now Pat. No. 8,954,395, which is a (Continued)

(51) Int. Cl.
*G06F 17/30* (2006.01)
*G06Q 10/08* (2012.01)
*G06F 21/62* (2013.01)

(52) U.S. Cl.
CPC ..... *G06Q 10/0833* (2013.01); *G06F 17/30011* (2013.01); *G06F 17/30303* (2013.01); *G06F 17/30309* (2013.01); *G06F 17/30368* (2013.01);

(Continued)

(58) Field of Classification Search
CPC .................................................. G06F 17/30079
See application file for complete search history.

(56) References Cited

U.S. PATENT DOCUMENTS 5,557,039 A 9/1996 Annis et al.
5,886,047 A 3/1999 Riddick et al.

(Continued)

OTHER PUBLICATIONS

Reconciling Transportation Record, Google Search, https://www.google.com, 2 pps., Sep. 17, 2014.

(Continued)

*Primary Examiner* — Mohammad S Rostami
(74) *Attorney, Agent, or Firm* — Goodwin Procter LLP

(57) ABSTRACT

Aspects of the present invention are directed to a system for next day reconciliation of transportation records. The system having a transportation record storage provider (TRSP) that receives and stores storage medium transportation requests; an outside service provider (OSP) inventory manager that receives and maintains records of transported storage mediums scanned at the OSP; and a reconciliation provider that receives a first list from the TRSP and a second list from the OSP inventory manger, for reconciliation. The reconciliation provider includes receivers for receiving the first and second list; a processing engine that reconciles the first list and the second list; and a reporting unit that reports the results of the reconciliation. The processing engine matches inbound and outbound records of the first list and second list, and processes invalid records; and analyzes and accounts for un-matched records.

24 Claims, 14 Drawing Sheets

Related U.S. Application Data continuation of application No. 13/756,595, filed on Feb. 1, 2013, now Pat. No. 8,655,849, which is a continuation of application No. 12/027,025, filed on Feb. 6, 2008, now Pat. No. 8,380,677.

(60) Provisional application No. 60/976,097, filed on Sep. 28, 2007.

(52) U.S. Cl.
CPC ... *G06F 17/30371* (2013.01); *G06F 17/30525* (2013.01); *G06F 21/6272* (2013.01); *G06Q 10/0838* (2013.01)

(56) References Cited

U.S. PATENT DOCUMENTS

| | | | |
|---|---|---|---|
| 7,069,278 | B2 | 6/2006 | Telkowski et al. |
| 2003/0220816 | A1 | 11/2003 | Giesler |
| 2005/0021524 | A1 | 1/2005 | Oliver |
| 2005/0039069 | A1 | 2/2005 | Prahlad et al. |
| 2005/0071194 | A1 | 3/2005 | Bormann et al. |
| 2005/0108205 | A1 | 5/2005 | Venditti et al. |
| 2005/0174869 | A1 | 8/2005 | Kottomtharayil et al. |
| 2005/0203888 | A1* | 9/2005 | Woosley ........... G06F 17/30864 |
| 2006/0106852 | A1* | 5/2006 | Siddall ............. G06F 17/30147 |
| 2007/0055686 | A1 | 3/2007 | Findlay et al. |
| 2007/0162359 | A1 | 7/2007 | Gokhale et al. |
| 2007/0296581 | A1 | 12/2007 | Schnee et al. |
| 2008/0061979 | A1 | 3/2008 | Hause et al. |
| 2008/0243938 | A1* | 10/2008 | Kottomtharayil ... G06F 11/1458 |
| 2008/0256110 | A1* | 10/2008 | Sen ........................ G06Q 10/06 |

OTHER PUBLICATIONS

Reconciling Transportation Record, Google Search, ACM DL Digital Library, https://www.dl.acm.org, 4 pps., Sep. 17, 2014.

* cited by examiner

TRSP 100

*FIG. 4*

| Time | REQUEST | TRSP | OSP Inventory Manager | Location at End of Transaction |
|---|---|---|---|---|
| A | Distribute to OSP | DC1 → OSP | DC → OSP | OSP |
| B | Pick from OSP | Error! No Record | OSP → DC | DC |
| C | Distribute to OSP | OSP → OSP | DC → OSP | OSP |

FIG. 5

ETRS

Dashboard | Photo Upload | IntentFile Upload | Search ETRS
View Matches | View Breaks | View Others | View Untouched

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | | | Distribution | | | | | Pick | | | | | Total | | |
| Data Center | Volume | T+1 Breaks | Aged Breaks | Matched | Break Rate | Volume | T+1 Breaks | Aged | Matched | Break Rate | Volume | T+1 Breaks | Aged | Matched | Break Rate |
| 1BOP | 39 | 0 | 0 | 39 | 0.00% | 40 | 0 | 0 | 40 | 0.00% | 79 | 0 | 0 | 79 | 0.00% |
| 270 Park | 15 | 0 | 0 | 15 | 0.00% | 9 | 0 | 0 | 9 | 0.00% | 24 | 0 | 0 | 24 | 0.00% |
| 345 Park | 1 | 0 | 0 | 1 | 0.00% | 5 | 0 | 0 | 5 | 0.00% | 6 | 0 | 0 | 6 | 0.00% |
| 4MYP | 5 | 0 | 0 | 5 | 0.00% | 0 | 0 | 0 | 0 | 0.00% | 5 | 0 | 0 | 5 | 0.00% |
| 500 Mission St | 1 | 0 | 0 | 1 | 0.00% | 1 | 0 | 0 | 1 | 0.00% | 2 | 0 | 0 | 2 | 0.00% |
| Belleville | 25 | 0 | 0 | 25 | 0.00% | 40 | 0 | 0 | 40 | 0.00% | 65 | 0 | 0 | 65 | 0.00% |
| CDC1 | 319 | 2 | 0 | 317 | 0.63% | 332 | 0 | 0 | 332 | 0.00% | 651 | 2 | 0 | 649 | 0.31% |
| CDC2 | 179 | 0 | 0 | 179 | 0.00% | 409 | 0 | 0 | 409 | 0.00% | 588 | 0 | 0 | 588 | 0.00% |
| Fountain Square | 8 | 0 | 0 | 8 | 0.00% | 84 | 0 | 0 | 84 | 0.00% | 92 | 0 | 0 | 92 | 0.00% |
| Highland Oaks | 33 | 0 | 0 | 33 | 0.00% | 22 | 0 | 0 | 22 | 0.00% | 55 | 0 | 0 | 55 | 0.00% |
| IIP | 61 | 0 | 0 | 61 | 0.00% | 141 | 0 | 0 | 141 | 0.00% | 202 | 0 | 0 | 202 | 0.00% |
| MCC | 299 | 0 | 0 | 299 | 0.00% | 47 | 0 | 0 | 47 | 0.00% | 346 | 0 | 0 | 346 | 0.00% |
| RDC | 399 | 0 | 0 | 399 | 0.00% | 411 | 0 | 0 | 411 | 0.00% | 810 | 0 | 0 | 810 | 0.00% |
| Somerset | 63 | 0 | 0 | 63 | 0.00% | 4 | 0 | 0 | 4 | 0.00% | 67 | 0 | 0 | 67 | 0.00% |
| Triad | 3 | 0 | 0 | 3 | 0.00% | 13 | 0 | 0 | 13 | 0.00% | 16 | 0 | 0 | 16 | 0.00% |
| Vision Drive | 185 | 0 | 0 | 185 | 0.00% | 175 | 0 | 0 | 175 | 0.00% | 360 | 0 | 0 | 360 | 0.00% |
| Total | 1635 | 2 | 0 | 1633 | 0.12% | 1733 | 0 | 0 | 1733 | 0.00% | 3368 | 2 | 0 | 3366 | 0.06% |

METHOD AND SYSTEM FOR RECONCILING TRANSPORTATION RECORDS

CROSS-REFERENCE TO RELATED APPLICATIONS

This application is a continuation of, and claims priority to, U.S. patent application Ser. No. 14/596,661, filed on Jan. 14, 2015, now U.S. Pat. No. 9,251,495, which is a continuation of U.S. patent application Ser. No. 14/136,636, filed on Dec. 20, 2013, now U.S. Pat. No. 8,954,395, which is a continuation of U.S. patent application Ser. No. 13/756,595, filed on Feb. 1, 2013, now U.S. Pat. No. 8,655,849, which is a continuation of U.S. patent application Ser. No. 12/027,025, filed on Feb. 6, 2008, now U.S. Pat. No. 8,380,677, which claims the benefit of U.S. Provisional Application 60/976,097, filed on Sep. 28, 2007. All the related applications identified above are incorporated herein by reference in their entireties to provide continuity of disclosure.

TECHNICAL FIELD

Methods and apparatuses of the present invention relate to records management, and in particular to reconciling data transportation records regarding the movement of data between a data center and an off-site data storage provider.

BACKGROUND OF THE INVENTION

Large institutions must analyze, categorize, and store enormous amounts of information that pass through their data centers daily. Recording mediums (hereinafter "media tapes") for storing the information may be held off-site at a depot managed by a third-party, a so-called outside service provider (OSP), just one example being Iron Mountain™. Once stored, the media tapes remain at the OSP until user at the institution requests them.

It is vitally important that when user at an institution requests a media tape, the media tape is actually located at the OSP. For example, large institutions use OSPs to store data from one of many data centers, and if a media tape is not located at the OSP then millions of dollars of potential earnings may be lost or paid out because of law suits. Further, physically locating the missing media tape may be an arduous task, especially if the media tape has been missing for a long time. In the past, companies have sent personnel to literally dig through landfills to find a lost media tape.

The same institution of the example above may use a transportation record storage provider (TRSP) as a centralized repository of records related to the transportation of media to assist with tracking. The TRSP stores logs/journals of requests by personnel at a data center to distribute or receive media tapes. The data center provides the distribution requests (requests to send media tapes to the OSP), and pick requests (requests to receive media tapes from the OSP) to the TRSP. The TRSP, therefore, is a centralized repository of logs/journals of the various requests. These logs/journals represent the "logical" movement of the media tapes, or in other words, the intended movement of the media tapes. Personnel may refer to the distribution lists and pick lists stored at the TRSP to learn where a media tape "should" reside.

Merely using a TRSP is not ideal because a logical movement of a media tape may not correspond to an actual, physical, movement of the media tape. The system may be improved by scanning the inbound and outbound movements of the media tapes at the data center, and storing records of the scans at the TRSP. The logical movements of the media tapes can be compared to the TRSP's records.

The improvement described above still is not fool-proof because the scan files and the TRSP's records do not disclose whether the media tapes were actually received and stored at the OSP or not. The system can be further improved by sending the journal/logs to the OSP for comparison. This solution is still not ideal because the responsibility for comparing records is with the OSP, responses to queries may not be timely, and the OSP can only compare its inventory to the journals/logs, which does not give a complete picture of when and where a mistake occurred.

In addition to problems of gathering and reconciling the logical and physical movements of media tapes, other errors may be introduced by the collection of information.

U.S. Pat. No. 7,069,278 ("System for archive integrity management and related methods") provides for one or more integrity manager applications, each of which monitors the integrity of an aspect of a data archive. Some integrity manager applications monitor the integrity of processes executed by the archive system, and other integrity manager applications monitor the integrity of communication paths in the archive system. However, U.S. Pat. No. 7,069,278 does not address reconciliation of transaction records, especially when the logical movements of media tapes do not correspond to the physical movement of the media tapes.

U.S. Pat. Nos. 6,886,047 and 6,557,039 ("System and Method for Managing Information Retrievals for Integrated Digital and Analog archives on a global Basis" and "System and Method for Managing Information Retrievals from Distributed Archives"), provide for a system and method for managing information retrievals from all enterprises' archives across different operating locations. A single "virtual archive" is provided which links all of the archives of the enterprise, regardless of the location or configuration of the archive. The virtual archive allows for data aggregation (regardless of location) so the a user can have data from multiple physical locations on a single screen in a single view. However, U.S. Pat. Nos. 6,886,047 and 6,557,039 do not address reconciliation of transaction records.

In addition to the deficiencies in the prior art noted above, none of the above mentioned systems is capable of analyzing data gathered during reconciliation to determine the root cause of misplaced data.

Other problems and drawbacks also exist.

Accordingly, a system is needed that can reconcile inbound and outbound records, correct for errors, and identify root causes, all within a time frame that allows for misplaced media tapes to be located before profits are lost or other expenses incurred.

BRIEF SUMMARY OF THE INVENTION

According to a first exemplary embodiment of the present invention, a method is provided for managing transport record. A first list is received from a transportation record storage provider (TRSP), and a second list is received from an outside service provider (OSP) inventory manager. Then, the first list and the second list are reconciled. The first list includes at least one record of a transport request, and the second list includes at least one record of at least one of an inbound transport and an outbound transport at the OSP.

According to another exemplary embodiment of the present invention, a system is provided for managing the transportation of media between a data center and an outside service provider. The system includes a TRSP operable to receive media transportation requests, and to store said media transportation requests. The system also includes an OSP inventory manager that receives records of transported media scanned at the OSP, and a reconciliation provider that receives a first list from the TRSP and a second list from the OSP inventory manger and reconciles the first list and the second list. The first list is based on the received media transportation requests and the second list is based on the records of transported media.

According to another exemplary embodiment of the present invention, a reconciliation provider is provided for reconciling transportation records. The reconciliation provider includes a first receiving unit that is operable to receive a first list from a TRSP, a second receiving unit that is operable to receive a second list from an OSP inventory manager, a processing engine that reconciles the first list and the second list; and a reporting unit operable to generate a report of the results of the reconciling of the first list and the second list, and a reporting unit operable to generate a report of the results of the reconciling of the first list and the second list. The processing engine may be further operable to process invalid records as well as analyze and account for un-matched records.

According to another exemplary embodiment of the present invention, a system is provided for managing the transportation of media between a data center and an outside service provider. The system includes a data center, a TRSP operable to receive a first list from the OSP inventory manager and reconcile the first list and a second list maintained by the TRSP. The first list is based on the records of transported media, and the second list is based on the received media transportation requests.

According to another exemplary embodiment of the present invention, a computer readable storage medium having thereon software instructions adapted to enable a computer to manage transport records, is provided. The software instructions enable the computer to perform the following operations. A first list is received from a transportation record storage provider (TRSP), and a second list is received from an outside service provider (OSP) inventory manager. Then, the first list and the second list are reconciled. The first list includes at least one record of a transport request, and the second list includes at least one record of at least one of an inbound transport and an outbound transport at the OSP

BRIEF DESCRIPTION OF THE DRAWINGS

The present invention is described in detail below with reference to the attached drawings figures, wherein:

FIG. 4 is a table illustrating the conditions of a record keeping error an exemplary embodiment of the present invention is operable to resolve.

FIG. 5 is an exemplary embodiment of a report produced by the present invention.

DETAILED DESCRIPTION OF EXEMPLARY EMBODIMENTS

The invention is generally directed to a next-day media transportation system environment and record reconciliation system. The reconciliation system ensures that daily transportation of media between, for example, internal data centers and OSPs is reconciled. The movement of physical media (e.g., digital tape drives) is treated so as to provide tracking and reconciliation similar to that which takes place in the movement of money or securities.

The benefits and advantages of the present invention should become apparent to one of ordinary skill from the following description based on the accompanying figures.

Figure 1:
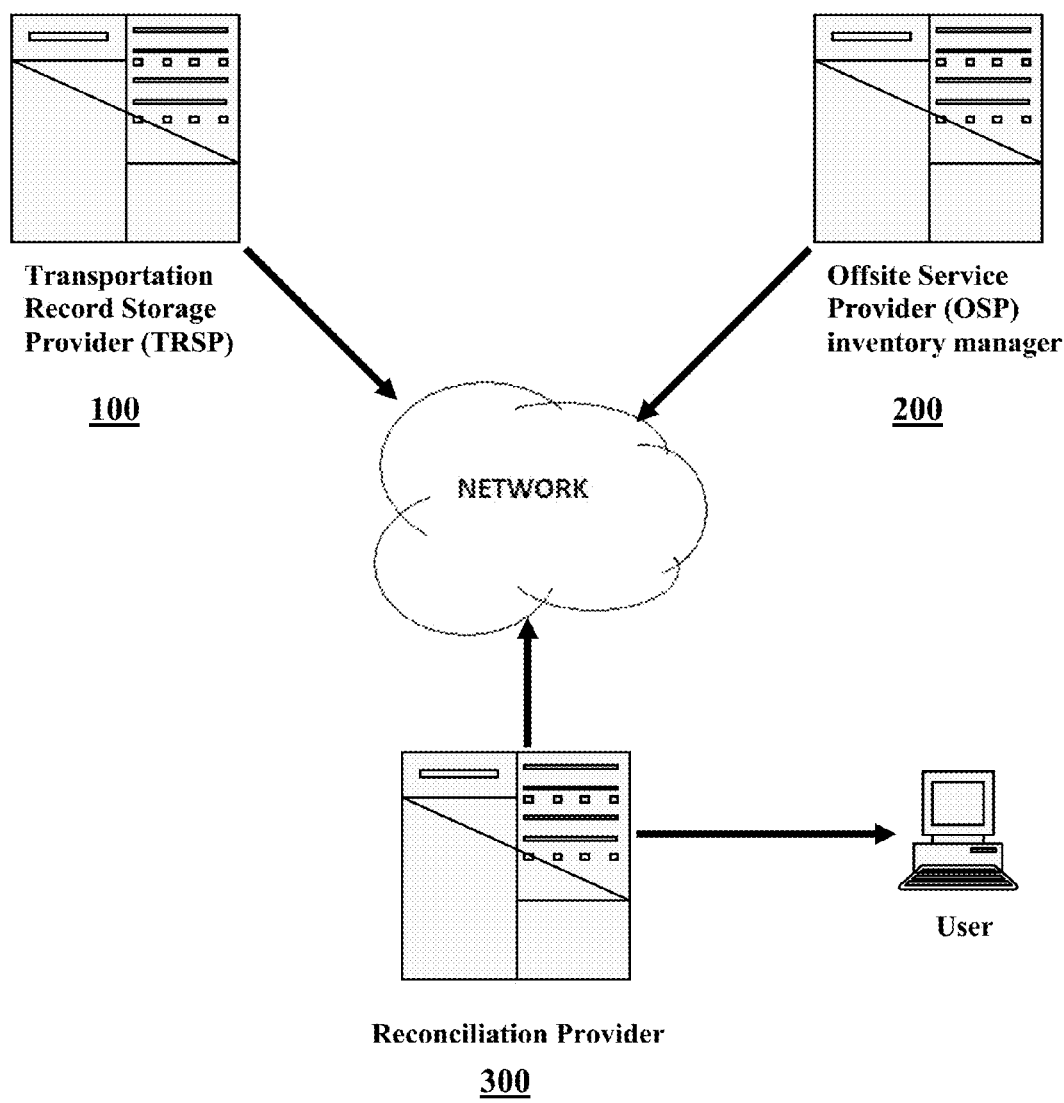
FIG. 1 is a block diagram illustrating a system according to an exemplary embodiment of the invention.

FIG. 1 illustrates a media transportation system environment 1 according to an exemplary embodiment of the present invention. The media transportation system environment 1 includes a transportation record storage provider (TRSP) 100, an outside service provider (OSP) inventory manager 200, and a reconciliation provider 300. Each of the TRSP 100, OSP inventory manager 200, and reconciliation provider 300, may communicate through a network, for example, the internet, a local network, or even a wireless communications network.

Figure 2:
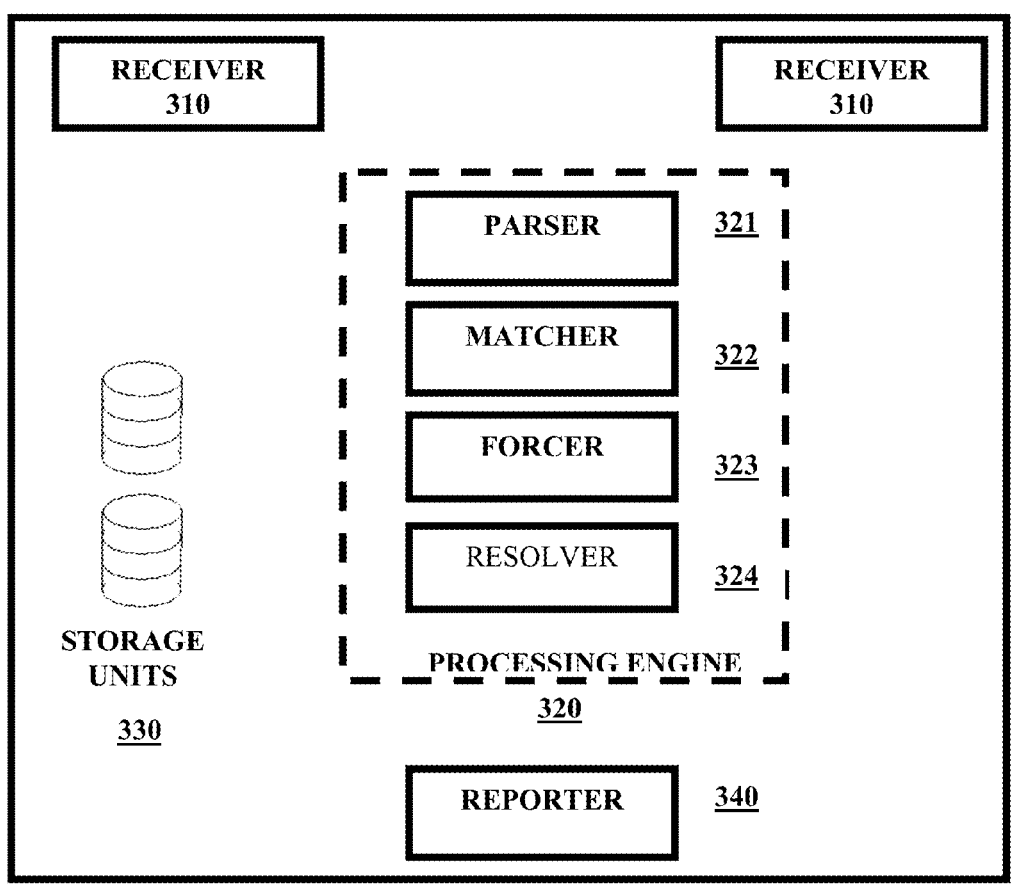
FIG. 2. is a block diagram illustrating a reconciliation provider according to an exemplary embodiment of the invention.

FIG. 2 illustrates a reconciliation provider 300 according to an exemplary embodiment of the present invention. The reconciliation provider 300 may include receivers 310, a processing engine 320, storage units 330, and a reporter 340. The processing engine 320 may include a parser 321, a matcher 322, a forcer 323, and a resolver 324. The parser 321, parses the feeds to create transactional based records of the media movements at the OSP and the data centers. The parser 321 ensures that differing formats of the various feeds do not impede the reconciliation. The matcher 322 matches the logical outbound movement of media tapes (information provided in a distribution list) and the physical movement of media tapes (recorded on, for example, a scan list). The matcher 322 also identifies breaks between logical movement of the media tapes and the physical movement of the media tapes. The forcer 323 may force off matched and invalid records. Finally, the resolver 324 may resolve invalid breaks.

Figure 3:
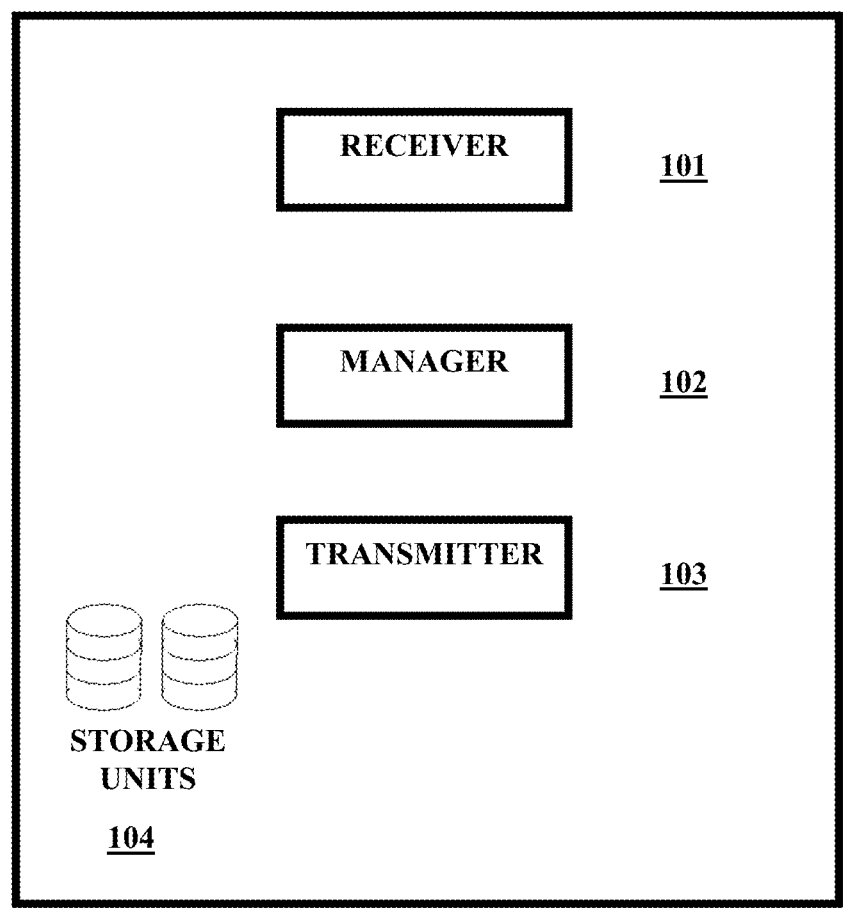
FIG. 3 a block diagram illustrating a transportation record storage provider according to an exemplary embodiment of the invention.
Figure 6:
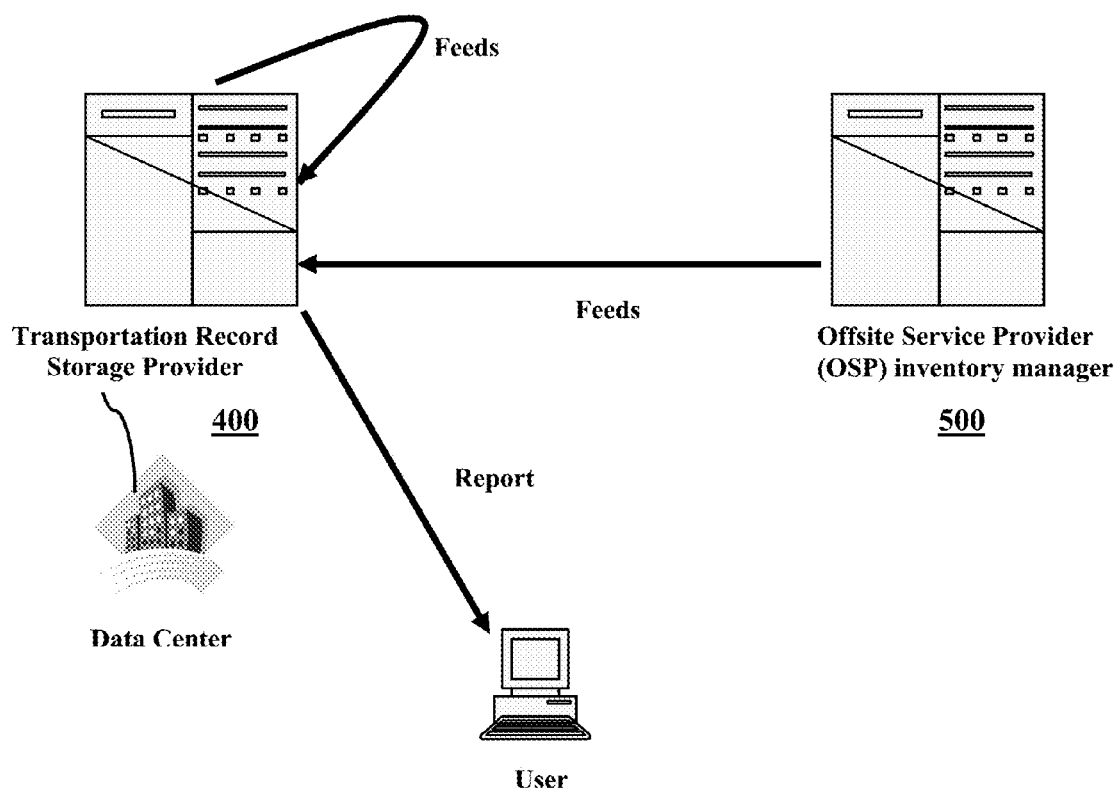
FIG. 6 is a block diagram of the system according to an exemplary embodiment of the invention.

FIG. 3 illustrates a TRSP 100 according to an exemplary embodiment of the present invention. The TRSP 100 may include a receiver 101, a manager 102, transmitter 103, and storage units 104. The receiver 101 may be configured to receive information about media transportation requests. The storage units 104 may store the information about media transportation requests. The manager 102 may manage the information stored in the storage unit 104. The transmitter 103 may transmit the feeds from the TRSP 100 to reconciliation provider 300.

The TRSP 100 receives feeds that include distribution and pick requests for various media tapes. A distribution request is a request to send a particular media tape to the OSP, and a pick request is a request to receive a particular media tape from the OSP. The feeds may arrive as e-mails, or may be sent directly to the TRSP 100 (e.g., sent via FTP (file transfer protocol)).

FIGS. 8-11 illustrate exemplary operations of the media transportation system environment 1 according to exemplary embodiments of the preset invention.

When media is transported from a data center to the OSP, the media may be scanned at the OSP, and a scan file may be created. The scan file is a log of all media tapes that pass in and out of the OSP. At the end of each day, the scan file is uploaded to the OSP inventory manager 200.

The next day, the reconciler 300 receives feeds from the OSP inventory manager 200 and the TRSP 100. The feed from the TRSP 100 may be a record of all of the transportation requests from the previous day. The feed from the OSP inventory manager 200 lists all media tapes scanned as they moved to and from the OSP.

It is important to note that while description is made with regard to a "next day" reconciliation system, one of ordinary skill in the art would recognize that the reconciliation system would work under any unit of time (e.g., seconds, minutes, hours, weeks, months, years). Furthermore, the reconciliation system could also operate on a per batch basis, where reconciliation is initiated on a batch of transport records.

Figure 8:
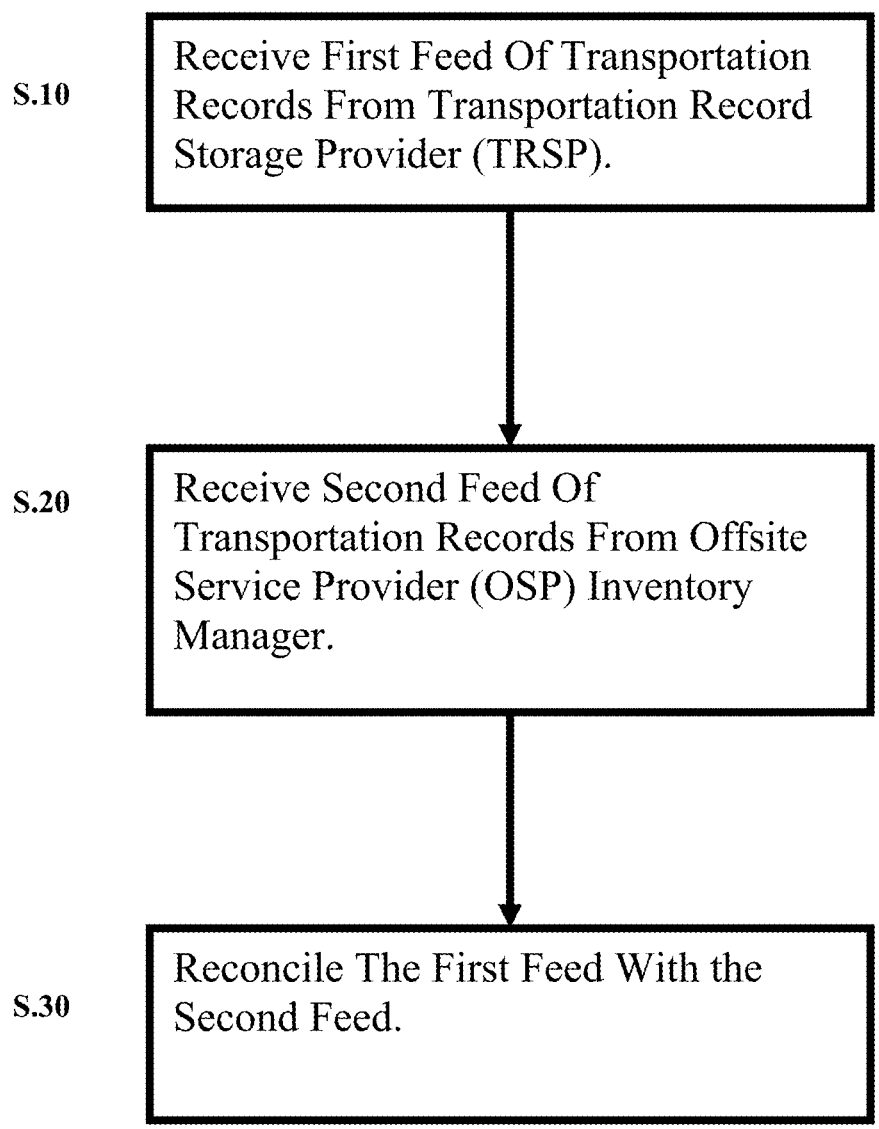
FIG. 8 is a flow chart illustrating an exemplary operation of an exemplary embodiment of the present invention.

As illustrated in FIG. 8, the reconciliation provider 300 receives a feed of transportation records from the TRSP 100 (S.10), and receives a feed of transportation records from the OSP 200 (S.20). As stated above, the feed from the TRSP 100 may include distribution and pick requests. Once the reconciliation provider 300 receives the feed from the TRSP 100 and the feed from the OSP 200, the reconciliation provider 300 reconciles the two feeds (S.30).

Figure 9:
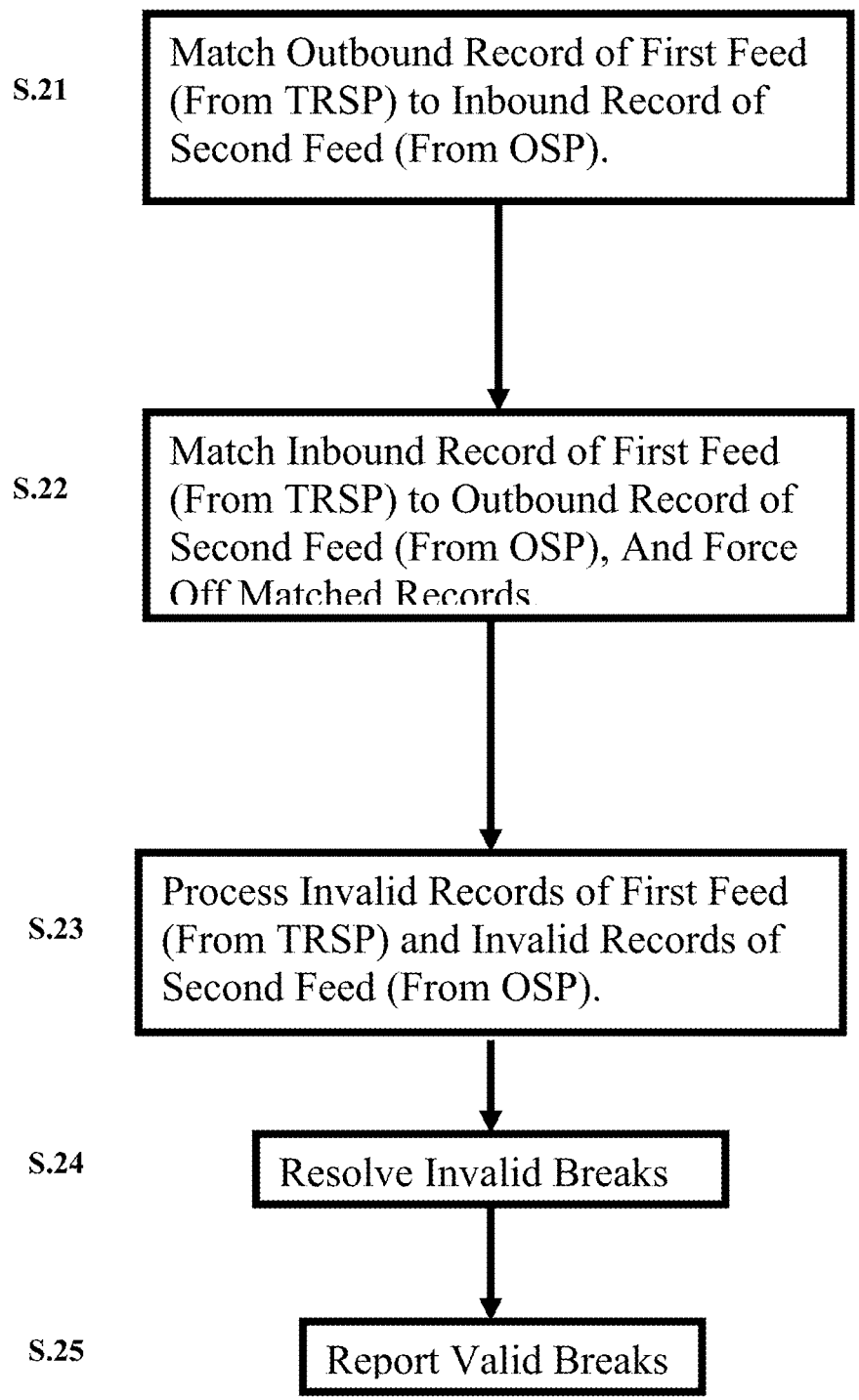
FIG. 9 is a flow chart illustrating an exemplary operation of an exemplary embodiment of the present invention.

FIG. 9 illustrates the matching process according to an exemplary embodiment of the present invention. The feeds from the TRSP 100 and OSP inventory manager 200 may include inbound and outbound transportation records. First, the matcher 322 matches the outbound records of the feed from the TRSP 100 to the inbound records of the feed from the OSP inventory manager 200 (S. 21). Next, the matcher 322 matches the logical inbound movement of media tapes (information provided on a pick list, which is a list of pick requests) and the physical/actual movement of media tapes (S. 22).

For example, if the feed from the TRSP 100 shows 20 media tapes distributed, but the feed from the OSP inventory manager 200 shows only 19 media tapes scanned on receipt, then reconciliation of the feed from the TRSP and the OSP inventory manager 200 shows one break.

Also as an example, if the feed from the TRSP 100 shows 20 media tapes requested, but the feed from the OSP inventory manager 200 only confirms 19 media tapes were scanned on their way out of the OSP, then that is one break.

Either before or after the matching is complete, the forcer 323 forces/eliminates invalid records of both the feed from the TRSP 100 and the feed from the OSP inventory manager 200 (S.23).

After breaks are identified, the breaks are categorized according to whether they are valid or invalid (not shown in the drawings). Valid breaks represent real discrepancies between the physical and logical movement of the media tapes, and signal that a media tape is lost. Invalid breaks do not represent real discrepancies between the physical and logical movements of the media tapes, and so a media tape is not necessarily lost.

Once the breaks, valid and invalid, have been identified, the resolver 324 attempts to eliminate the invalid breaks (S.24). Finally, the reporter 340 reports any breaks identified during the reconciliation process (S.25).

Figure 10:
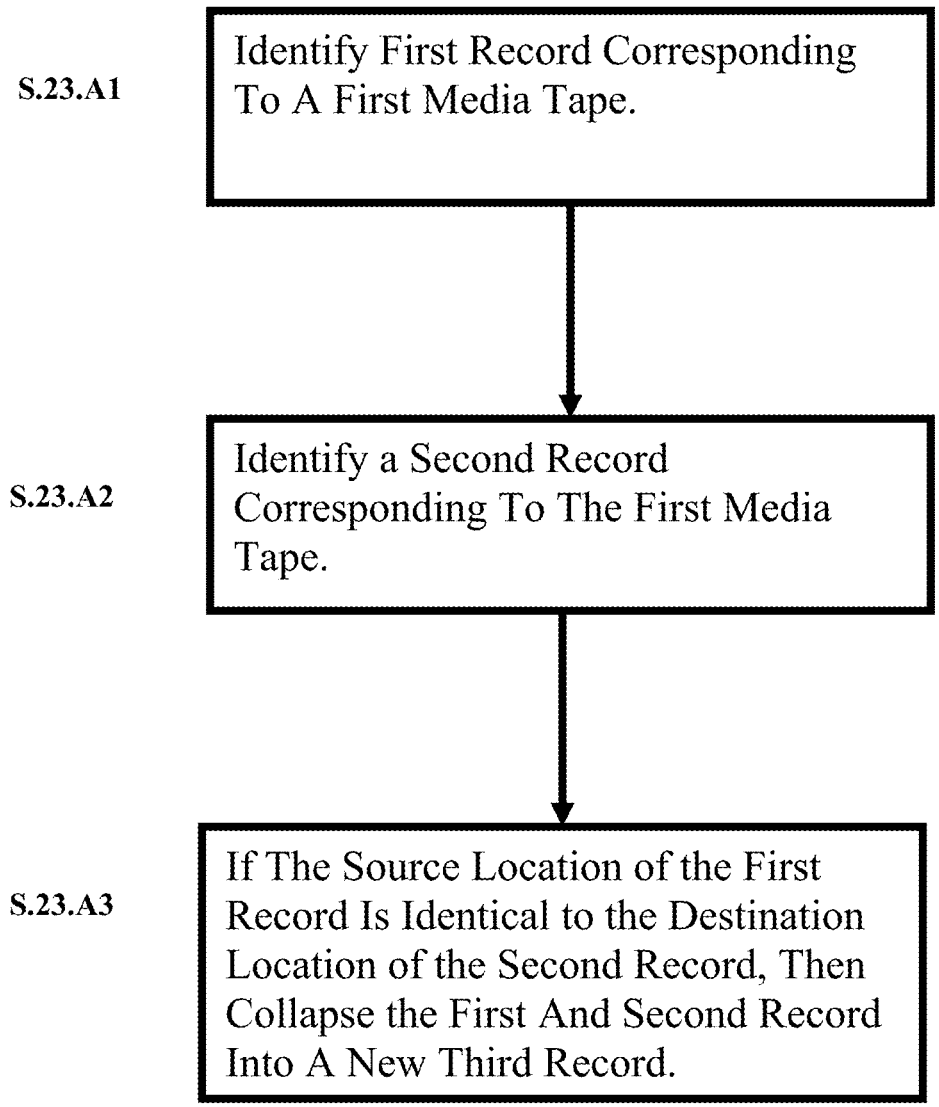
FIG. 10 is a flow chart illustrating an exemplary operation of an exemplary embodiment of the present invention.

There are many different situations that might cause an invalid break, and that may be resolved by matching logic. FIG. 10 illustrates the resolving process according to an exemplary embodiment of the present invention.

For example, if a request to distribute a media tape is received, and then before the media tape is moved offsite, another request is received to recall the media tape for data recovery purposes, then the feed sent by the TRSP 100 to the reconciler 300 includes two requests with respect to that media tape. However, since the media tape never reached the OSP, the media tape was never scanned and therefore a record of the physical movement of the tape does not appear in the feed sent to the reconciler 300 by the OSP inventory manger 200.

According to the exemplary embodiment illustrated in FIG. 10, the invalid break resolver 324 identifies that two records (or journals) corresponding to the recalled media tape (S.23.A1 and S.23.A2), and collapses the records into a new third record with the starting position of the first (earlier in time) entry and the ending position in the second (later in time) entry (S.23.A3). The new record shows the same start and end location (e.g., data center A to data center A). During the next reconciliation, the invalid record resolver 324 eliminates the new record. Essentially, the reconciler treats this as a movement between data centers—in this case, a movement to and from the same data center. However, while in transit, the media may be recalled to a different data center then the source data center. If the media is transported to a different data center than the source data center, then the two request are still collapsed and removed by the reconciler as an internal movement between two data centers.

Figure 11:
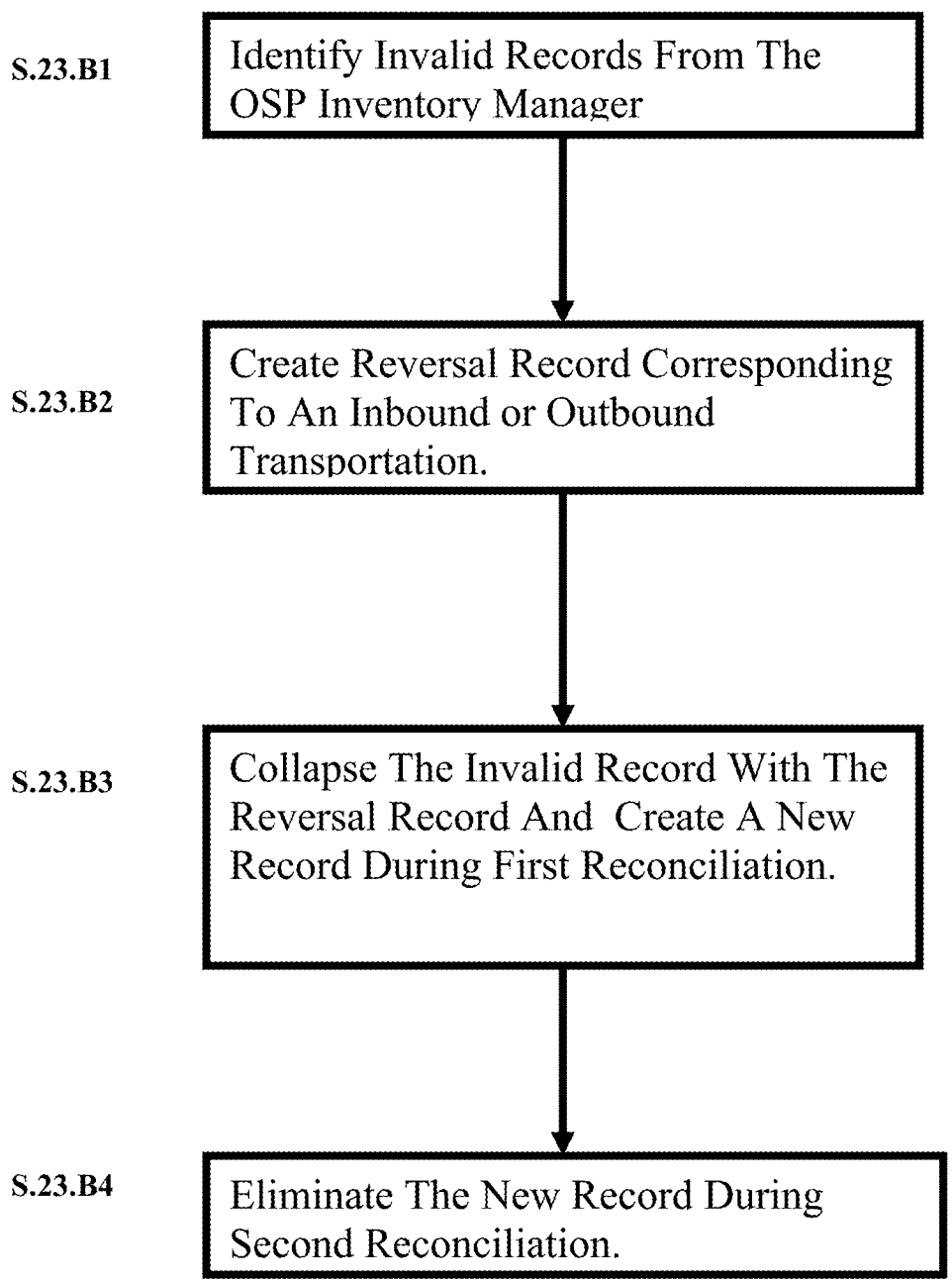
FIG. 11 is a flow chart illustrating an exemplary operation of an exemplary embodiment of the present invention.

According to another exemplary embodiment illustrated in FIG. 11, the resolver 324 is operable to identify where an invalid move is recorded in the feed sent by the OSP inventory manager 200 (S.23.B1). For example, a scan list might show receipt at the OSP, but in fact there is no receipt by the OSP because there was no distribution request. In response to the invalid move, the resolver 324 creates a reversal record corresponding to a movement back to the data center (S.23.B2). During the next reconciliation, the matcher 322 collapses the invalid record and the reversal record into a new record (S.23.B3). Finally, during the next reconciliation (the second since the record was collapsed), the new record is removed (S.23.B4).

According to another exemplary embodiment illustrated by FIG. 4 the matcher 322 is operable to identify invalid breaks caused by a "previously wrong location" error. A "previously wrong location error" occurs when the TRSP 100 records a logical movement with the wrong starting location. The circumstances of a "previously wrong location" error are illustrated in FIG. 4. At time 'A' user requests the distribution of a media to the OSP. The TRSP 100 records the request as a transfer from the data center to the OSP. When the media tape is scanned at the OSP, the OSP inventory manager 300 updates its records to show a transport from the data center to the OSP. At time 'B' user requests a pick on the media tape (i.e., transport the media tape from the OSP to the data center). The OSP inventory manager 200 updates its records to show a transport from the OSP to the DC. The TRSP 100, however, fails to record the transport request. At time 'C' user requests the distribution of the media tape to the OSP. Because the TRSP 100 continues to reflect that the media tape is stored at the OSP, the TRSP 100 records the request at time 'C' as a transfer from the OSP to the OSP. Finally, the OSP inventory manager 200 updates its records to show a transport from the data center to the OSP.

Under the circumstances illustrated in FIG. 4, after reconciliation is complete there will be several un-matched records, particularly the unmatched OSP side records at times 'B' and 'C', and the TRSP 100's record at time 'C'.

An invalid break my also occur if a media is still in transit during reconciliation (i.e., there is a distribution request from TRSP to OSP but no record of receipt at the OSP because the media is still traveling), and it the transit time of the media has not exceeded a time limit. These invalid breaks may be resolved by excluding the unmatched records until the time limit is exceeded.

Although the exemplary embodiment described thus far all assume a single TRSP and a single OSP, the reconciliation provider is capable of reconciling feeds from multiple TRSPs and OSPs.

Figure 7:
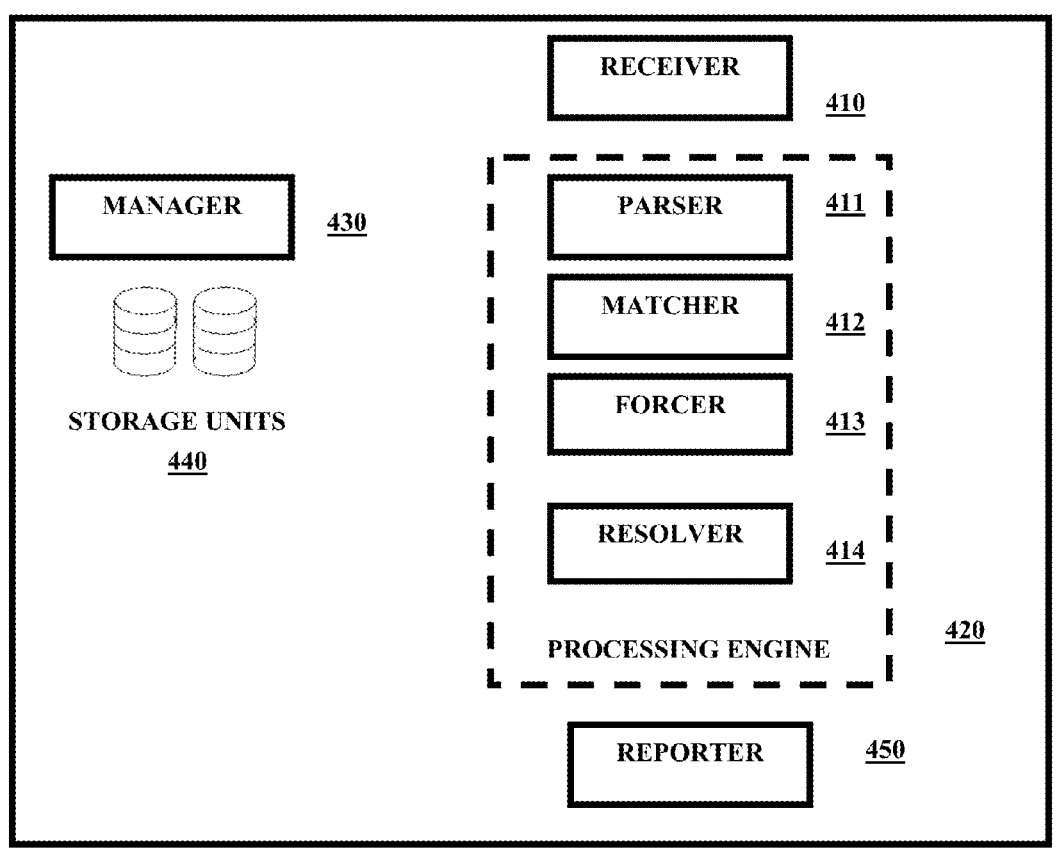
FIG. 7 is a block diagram of a transportation record storage provider according to an exemplary embodiment of the present invention.

FIG. 7 illustrates another exemplary embodiment of the system where the reconciler 300 is integrated into the TRSP. The receiver 410 may receive distribution and pick requests, and receive records from an OSP inventory manager. The processing engine 420 and its components (parser 411, matcher 412, forcer 413, and resolver 414) operate essentially the same as the processing engine 320 illustrated in FIG. 2.

Figure 12:
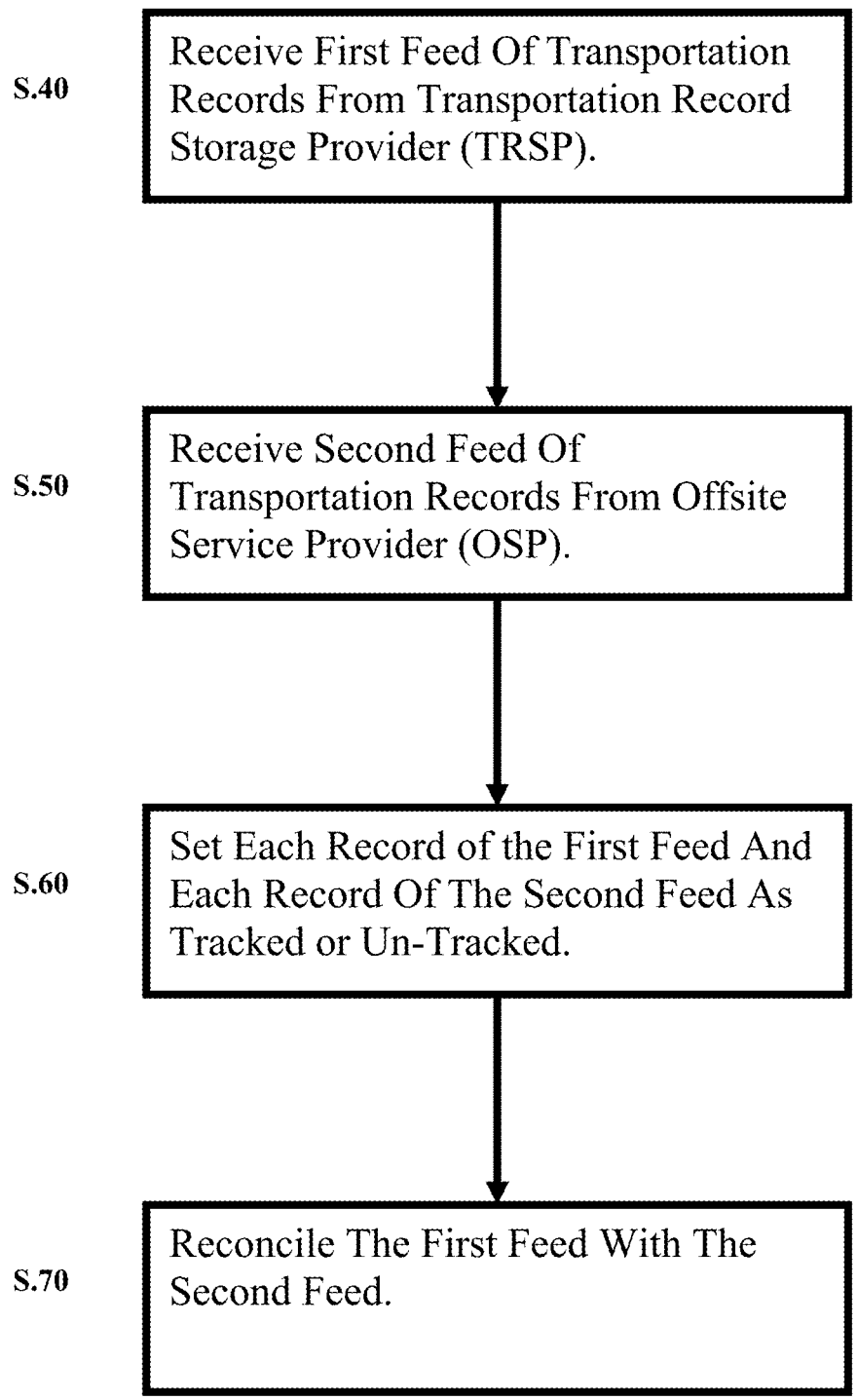
FIG. 12 is a flow chart illustrating an exemplary operation of an exemplary embodiment of the present invention.

FIG. 12 illustrates the present invention according to another exemplary embodiment where transportation records may be set as tracked or untracked. Untracked records are not included in the reconciliation process and are not matched. Further, untracked records are not considered when determining the number of breaks. A basic operation might proceed as follows. First, the reconciliation provider 300 receives a first feed of transportation records from the TRSP 100 (S.40), and a second feed for transportation records from the OSP inventory manager 200 (S.50). Next, each record of the first feed and second feed are set as either tracked or untracked (S.60). Finally, the tracked records of the first received feed are reconciled with the tracked records of the second received feed (S.70).

Figure 13:
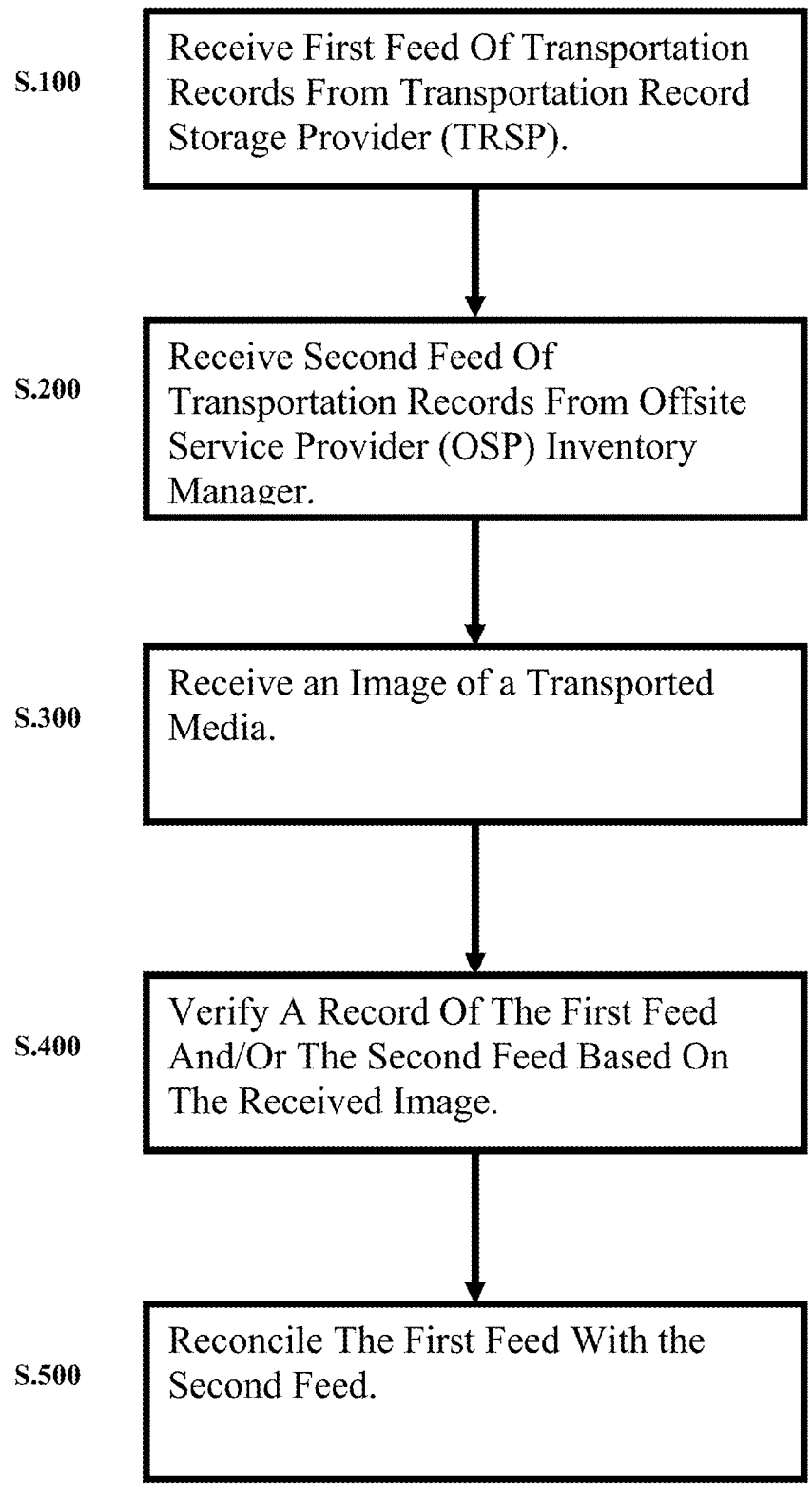
FIG. 13 is a flow chart illustrating an exemplary operation of an exemplary embodiment of the present invention.

FIG. 13 illustrates the present invention according to another exemplary embodiment where transport records are verified using an image. A first feed of transportation records from the TRSP 100, and a second feed for transportation records from the OSP inventory manger 200 are received (S. 100 and S. 200). Next, images of media captured before the media is transported off-site are received (S.300). Then, each record of the first received feed and the second received feed is verified based on the received images (S.400). Finally, the records of the first received feed are reconciled with the records of the second received feed (S.500). The images may be captured at a very high quality so that the serial numbers of the media tapes may be read from the pictures.

Figure 14:
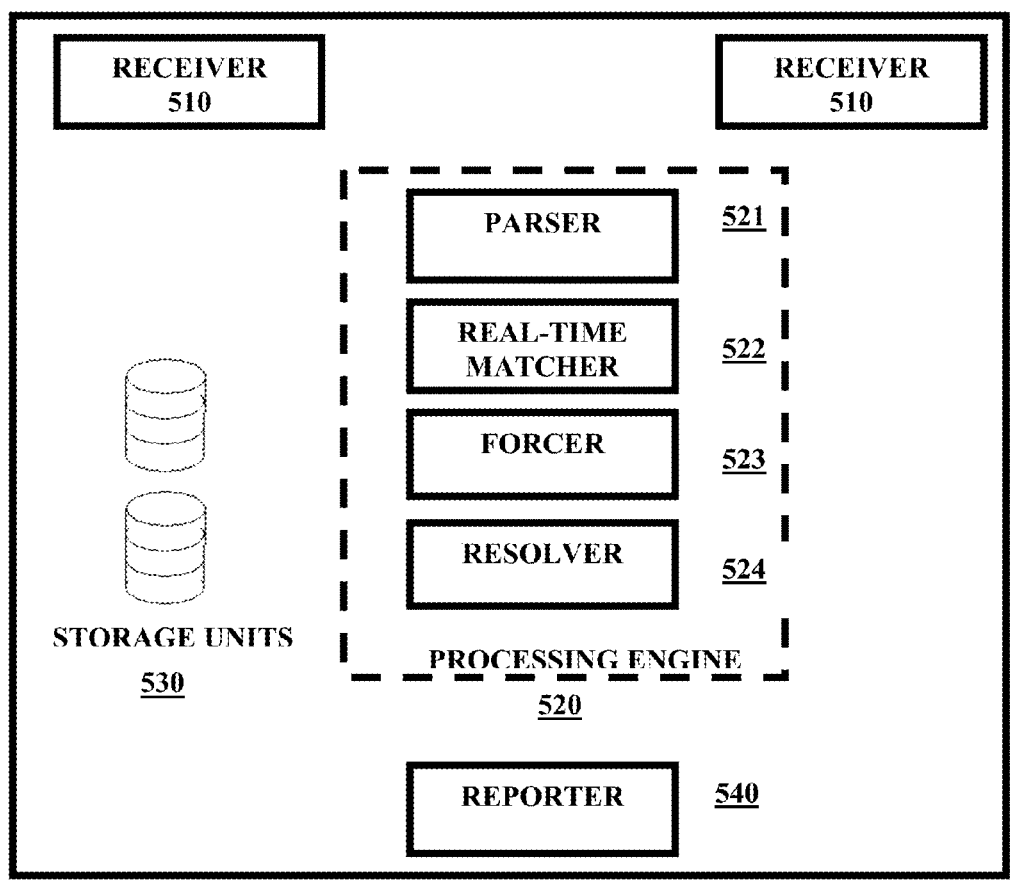
FIG. 14 is a flow chart illustrating an exemplary operation of an exemplary embodiment of the present invention.

FIG. 14 illustrates the present invention according to another exemplary embodiment where reconciliation occurs in real-time. A real-time reconciliation provider 500 may include the same elements as the reconciliation provider 300, further including a real-time matcher 522. In a real-time system, the TRSP 100 and OSP inventory manager 200 continually transmit feeds of logical and actual movements of media to the real-time reconciliation provider 500. Alternatively, there reconciliation provider 500 may continually pull feeds from the TRSP 100 and OSP inventory manager 200. The real-time matcher 522 continually compares new records to records stored in storage units 330. The reporter 340 may continually print out reports, or may print out reports as requested by a user.

It may be noted that wireless id tagging of the media may be used in conjunction with the system described immediately above to facilitate real-time reconciliation. Wireless tagging shortens lag time between physical movements of media and the creation of records (the logical movements).

FIG. 5 illustrates a report generated by the reconciliation provider, according to an exemplary embodiment of the present invention. It should be noted that the Data Centers column 0 lists many different data centers. This is because the present invention is capable of reconciling transport records to and from many different data centers and OSPs. The report includes sections, columns 1 to 4 for distributions, columns 5 to 9 for picks, and columns 10-14 which combine the distribution and pick sections. Each section includes records of various distribution and pick requests. For example, the distribution section shows a distribution request from 1BOP for volume 39. There were no breaks at T+1, there were no aged breaks (previously unaccounted for breaks), and the request was matched. Further, since there were no breaks, the break rate is 0.0%.

In addition to the report illustrated in FIG. 5, the presenting invention is capable of robust statistical reporting, including graphs. In addition a backend database (not shown) may be included that is used to generate reports, and maybe accessed to generate specially tailored reports.

According to another exemplary embodiment, the present invention is capable of reconciling the movement of closed containers between a data center and an OSP. Closed containers are containers which hold multiple instances of media tape. The OSP tracks a container rather than tracking a container's contents. To track the movement of the media tape in the closed containers, the container contents are noted when the containers are loaded, and an image may be captured (for example, using the same high quality camera noted above) to prove that the media tapes are in the container.

According to another exemplary embodiment, the present invention may reconcile the movement of media tapes between internal vaults of the OSP. Vaults are a logical division of the OSP storage system. The movement between vaults will not have a matching record on the data center side. Therefore, internal movements between vaults are reconciled to each other at the same time as other records of inbound and outbound movement to and from datacenters and an OSP are reconciled.

According to one exemplary embodiment, the TRSP may have internal sites mapped to particular data centers and OSPs. The internal sites may include an indication of media located at the data centers or OSPs mapped to the TRSP's internal sites. In this exemplary embodiment, the physical movement of media is confirmable by reviewing the TRSP's internal sites. While the level of specificity of the TRSP's internal sites are described with regard to data centers and OSPs, the granularity may be finer, including logical vaults within the OSP or tape racks at a datacenter.

According to another exemplary embodiment the reconciler may reconcile the movement of media between data centers. According to this exemplary embodiment, a break may occur if the transport time exceeds some predefined limitation (i.e., two days). Otherwise, the unmatched distribution record is not considered part of a break until that limitation is exceeded.

According to another exemplary embodiment the reconciler may reconcile the movement of media between OSPs, possibly due to an account migration. In the case of an account migration, a first record of the exit from the source OSP is created, and a second record of entry at the destination OSP is created. The first and second records are reconciled with each other. In addition, the TRSP's internal records may be updated to reflect the movement of the media.

According to another exemplary embodiment matching records may be accomplished based on the variables: to/from, data center, account, logical vault, intended direction, and volume serial number.

According to another exemplary embodiment the reconciler provides robust analysis of the root cause of breaks to enable further refinement of the matching logic.

According to another exemplary embodiment risk factors are assigned to particular media tapes to facilitate disaster recovery, and store and archive pictures of media containers for verification purposes. Further, during a disaster situation the reconciler 300 is operable to create exceptions to the breaking logic. For example, limitations may exist as to which data centers or OSPs media may be transported to under normal conditions. If media is transported to an unauthorized data center or OSP, that may create a break. Therefore, the reconciler may create exceptions to breaks caused by transport of media to an unauthorized data center or OSP. The exception to the breaking logic may be limited to specific date or time ranges.

According to another exemplary embodiment the media tapes are attached to radio frequency identification (e.g., RFID) tags.

The media transportation system environment as shown in FIGS. 1, 2, 3, 6, 7 and 14 may be or include a computer system. The media transportation system environment may be described in the general context of computer-executable instructions, such as program modules, being executed by a computer. Generally, program modules include routines, programs, objects, components, data structures, etc. that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The media transportation system environment may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, microcontroller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array). RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

What is claimed is:

1. A computer-implemented method for managing the transportation of physical objects, the method comprising:
   tracking, by at least one computer, logical movements of a plurality of physical object items based on a first data feed comprising a first set of transport records each identifying a logical location with respect to which a corresponding physical object item should have been shipped or delivered, wherein the first set of transport records comprise at least one of:
      one or more inbound records identifying physical object item(s) to be received by a specified destination, and
      one or more outbound records identifying physical object item(s) to be shipped from a specified origin;
   tracking, by the at least one computer, physical movements of the plurality of physical object items based on a second data feed, wherein the second data feed comprises a second set of transport records each identifying an actual location with respect to which a corresponding physical object item has been shipped or delivered, and wherein the second set of transport records comprise at least one image, taken of at least one transported physical object item, associated with at least one of:
      one or more inbound records reflecting at least one inbound transport of said at least one physical object item actually received by one or more facilities, and
      one or more outbound records reflecting at least one outbound transport of said at least one physical object item actually shipped by the one or more facilities;
   identifying said at least one transported physical object item based on the at least one image; and
   reconciling, by the at least one computer, the first data feed and the second data feed, to identify any discrepancy between the first set of transport records and the second set of transport records with respect to said at least one physical object, the reconciling further comprising:
      comparing said one or more inbound records of the first set of transport records with said one or more outbound records of the second set of transport records, and
      comparing said one or more outbound records of the first set of transport records with said one or more inbound records of the second set of transport records.

2. The method according to claim 1, wherein the physical object item(s) are selected from a group consisting of: a magnetic hard disk, an optical disk, a flash memory, a floppy disk, a compact disk, and a magnetic tape.

3. The method according to claim 1, further comprising:
   processing an invalid break between the first set of transport records and the second set of transport records.

4. The method according to claim 3, further comprising:
identifying a first record of the first set and a second record of the first set each corresponding to the transport of a first physical object, and
if a source location of the first record is identical to a destination location of the second record, collapsing the first record and the second record into a new third record.

5. The method according to claim 3, further comprising:
identifying a first record of the second set and a second record of the second set each corresponding to the transport of a first physical object, and
if a source location of the first record is identical to a destination location of the second record, collapsing the first record and the second record into a new third record.

6. The method according to claim 1, wherein the second set of records are created by scanning said at least one physical object item while its physical movements are being tracked.

7. The method according to claim 1, further comprising:
if the second set comprises an incorrect record, removing the incorrect record, wherein an incorrect record is a record reflecting a physical movement of said at least one physical object item that did not actually occur.

8. The method according to claim 1, wherein the first data feed and the second data feed are reconciled in real-time.

9. The method according to claim 1, further comprising:
assigning each record of the first set of transport records and each record of the second set of transport records with either a tracked status or an un-tracked status.

10. The method according to claim 9, wherein only the tracked first set of transport records and the tracked second set of transport records are reconciled.

11. The method according to claim 10, further comprising:
assigning a record the un-tracked status if the record indicates the corresponding physical object item is transported for disaster recovery purposes.

12. The method according to claim 1, further comprising:
reconciling internal transport of physical object items within a facility or among a number of related facilities.

13. The method according to claim 1, wherein the at least one computer comprises a hand-held wireless device.

14. The method according to claim 1, wherein the at least one computer comprises a user interface having a touch screen.

15. The method according to claim 1, wherein the at least one computer is configured to communicate with a hand-held wireless device.

16. The method according to claim 15, wherein the hand-held wireless device comprises a user interface having a touch screen.

17. The method according to claim 15, wherein the received at least one image is taken by with hand-held wireless device.

18. A non-transitory computer readable medium for managing the transportation of physical objects, the computer readable medium comprising instructions for causing at least one computer processor to perform the following:
tracking, by at least one computer, logical movements of a plurality of physical object items based on a first data feed comprising a first set of transport records each identifying a logical location with respect to which a corresponding physical object item should have been shipped or delivered, wherein the first set of transport records comprise at least one of:
one or more inbound records identifying physical object item(s) to be received by a specified destination, and
one or more outbound records identifying physical object item(s) to be shipped from a specified origin;
tracking, by the at least one computer, physical movements of the plurality of physical object items based on a second data feed, wherein the second data feed comprises a second set of transport records each identifying an actual location with respect to which a corresponding physical object item has been shipped or delivered, and wherein the second set of transport records comprise at least one image, taken of at least one physical object item, associated with at least one of:
one or more inbound records reflecting at least one inbound transport of said at least one physical object item actually received by one or more facilities, and
one or more outbound records reflecting at least one outbound transport of said at least one physical object item actually shipped by the one or more facilities;
identifying said at least one transported physical object item based on the at least one image; and
reconciling, by the at least one computer, the first data feed and the second data feed, to identify any discrepancy between the first set of transport records and the second set of transport records with respect to said at least one physical object, the reconciling further comprising:
comparing said one or more inbound records of the first set of transport records with said one or more outbound records of the second set of transport records, and
comparing said one or more outbound records of the first set of transport records with said one or more inbound records of the second set of transport records.

19. The non-transitory computer readable medium of claim 18, wherein the instructions are adapted for execution on a hand-held wireless device.

20. An apparatus for managing the transportation of physical objects, the apparatus comprising:
at least one mobile computing device including a processor and a physical object, the at least one computer being configured with a mobile application software to:
receive a first data feed comprising a first set of transport records each identifying a logical destination to which a corresponding physical object item should have been shipped or delivered, wherein the first set of transport records comprise at least one of:
one or more inbound records identifying physical object item(s) to be received by a specified data center, and
one or more outbound records identifying physical object item(s) to be shipped from a specified data center;
receive a second data feed comprising a second set of transport records each identifying an actual destination to which a corresponding physical object item has been shipped or delivered, and wherein the second set of transport records comprise at least one image, taken of at least one physical object item, associated with at least one of:

one or more inbound records reflecting at least one inbound transport of said at least one physical object item actually received by the second provider, and one or more outbound records reflecting at least one outbound transport of said at least one physical object item actually shipped by the second provider;

identify said at least one transported physical object item based on the at least one image; and reconcile the first data feed and the second data feed, to identify any discrepancy between the first set of transport records and the second set of transport records, by:

matching, or identifying a break between, said one or more inbound records of the first set of transport records and said one or more outbound records of the second set of transport records, and matching, or identifying a break between, said one or more outbound records of the first set of transport records and said one or more inbound records of the second set of transport records.

21. The apparatus according to claim 20, where the at least one mobile computing device comprises a hand-held wireless device.

22. The apparatus according to claim 21, where the hand-held wireless device is a mobile telephone.

23. The apparatus according to claim 21, where the hand-held wireless device is a personal digital assistant (PDA) device.

24. The apparatus according to claim 21, wherein the hand-held wireless device is configured to capture said at least one image of said at least one physical object item.

* * * * *